3,338,905
WAX COATING COMPOSITION
Hallard C. Moyer, Homewood, Ill., Theodore J. Karr, Gary, Ind., and Arnold L. Guttman, Chicago, Ill., assignors to Sinclair Research, Inc., New York, N.Y., a corporation of Delaware
No Drawing. Filed Nov. 15, 1963, Ser. No. 323,871
8 Claims. (Cl. 260—28.5)

This invention relates to wax coating compositions characterized by good blocking resistance and superior heat sealability to a variety of substrates, particularly transparent synthetic films.

Large quantities of petroleum wax are consumed in coating or impregnating paper of other flexible wrapping materials for various packaging uses. In one such use, a printed paper label is waxed in such a fashion that a wax film is retained on both surfaces of the sheet. This label is used, together with a transparent film material, to wrap bread. The waxed label or "bread band" encircles the central region of the loaf under the transparent wrapper which encloses the entire loaf. Closure of the package is obtained (except for the ends) by heat sealing the transparent film and band as a lap seam along the bottom of the loaf, two plies of transparent film and two plies of waxed band being involved in this lap seam.

In order to obtain secure closure it is necessary to obtain a strong heat seal bond between the waxed band and the transparent film. This imposes rather severe performance requirements on the wax in question. Any of several diverse types of transparent film may be used, and each such film exhibits different adhesion characteristics and presents a different sealing problem with respect to wax performance. It is highly desirable that the wax coating on the paper band form a strong bond between the band and the transparent film, regardless of the type of transparent film used, as the baker desires all possible freedom in his choice of transparent films and may wish to use several types, alternately. Furthermore, the band maker prefers the efficiency of operation resulting from the use of a single wax composition which will meet these diverse requirements. It is not enough that the wax form a strong seal between paper and the transparent film when the seal is made by some efficient technique involving substantial pressure and good contact between the members. A strong seal must be obtained using the very light pressures and relatively poor contact between members which are incident to wrapping loaves of very soft bread. The problem of wax performance is further complicated by the need of the waxed band to seal well when handled on any of the variously designed wrapping machines used by bakeries.

Of the several types of transparent film used for packaging bakery goods, polypropylene, in particular, has presented a difficult wax sealing problem. Wax compositions affording good heat sealability to polypropylene heretofore have been of such a soft or sticky nature that the waxed paper band, when wound in rolls, fuses or "blocks" to itself and cannot be unwound without damage or costly operating delays. Schemes used in attempting to overcome this blocking difficulty have included, e.g. use of a block-resistant coating at the expense of good seal strength, or incorporating an anti-blocking agent such as stearamide or oleamide in the wax, or applying a thin film of a silicone oil on the wax surface. Normally, when the above-mentioned anti-blocking aids are used in an amount required to be effective, a loss of seal strength occurs either immediately after the seal is made or on aging a few hours. This loss of strength occurs as a result of migration of the anti-blocking agent to the interface between the wax and the transparent film, and it is particularly damaging in seals involving polypropylene film. So, while such anti-blocking agents have been used successfully in some situations, they heretofore have been of little or no utility in surmounting the problems associated with wax seals involving polypropylene film.

A wax composition has now been discovered which affords high bond strength even when sealing a ply of cellulosic or other fibrous material to synthetic film, e.g. paper to polypropylene film, yet affords such good blocking resistance that coatings involving the composition will not block in storage under the range of conditions of temperature and pressure normally encountered in commercial use. Furthermore, strong seals can also be formed readily with other frequently used transparent synthetic films as, for instance, nitro-cellulose coated cellophane, polyvinylidene chloride-coated cellophane, and polyethylene. Moreover, such high strength seals can be formed to these films using a wide choice of sealing temperature, pressure, time and cooling conditions, so that high strength seals can be formed at a wide variety of conditions such as may be encountered on variously designed commercial wrapping machines. Still another advantage of the composition is that viscosity can be made low enough to permit paper to be waxed at reasonably high speed on most types of conventional waxing equipment. Another advantage is the absence of any volatile or flammable solvent, the presence of which would create a vapor disposal problem.

A further contemplated advantage made possible by the unusually effective and versatile heat sealing characteristics is the use of the compounds of this invention as an adhesive for "end labels," the paper labels often used to close tightly the ends of a bread package and provide convenient space for brand identification on the end of the loaf. Adhesive compositions are already available which can provide strong, tight closure when used with any of the transparent films normally encountered. However, these adhesives are not also of utility for coating bands because they are of very high viscosity, cannot be handled with conventional high speed waxing equipment, are prone to "block" and are expensive. (Blocking is inherently less of a problem on end labels because these are coated on only one side, and when wound in rolls, the adhesive does not come in contact with itself.) It obviously would be very advantageous to be able to use the same wax compound for waxing all bands and all end labels, particularly with a less expensive compound than is normally required for end labels.

The composition of the present invention consists essentially of a petroleum wax blend of paraffin and microcrystalline waxes of specific properties and proportions having incorporated therein minor, defined amounts of each of a wax-compatible rubbery polymer and two specific types of anti-blocking additives.

The petroleum wax blend, or wax base has a composition of about 55 to 75% paraffin or crystalline wax and about 25 to 45% microcrystalline wax. Although microcrystalline wax is generally considered to be superior to paraffin wax as an adhesive, it is found, surprisingly, that for compositions of this invention to exhibit proper adhesivity to, for instance, polypropylene film, the paraffin wax content should be predominant at more than 50% of the total wax content. By paraffin wax is meant those waxes derived from petroleum distillates boiling at less than about 1050° F. The paraffin wax component of the invention is further characterized by having, typically, a melting point of 135 to 148° F., preferably about 136 to 144° F., a refractive index at 80° C. of 1.4290 to 1.4380, preferably 1.4320 to 1.4350, a viscosity of 39 to 48 Saybolt seconds Universal at 210° F., preferably 41 to 45, an oil content of less than 1%, and a needle penetration (D1321) at 77° F. of about 25 maximum. This paraffin component may be obtained by conventional processing of an appropriate waxy petroleum distillate, or it may be obtained by blending together two or more separately prepared paraffinic waxes such that the desired properties are obtained.

The microcrystalline wax component of the invention is characterized by having, typically, a viscosity of about 70 to 100, preferably about 80 to 90 SSU at 210° F. It should have a needle penetration at 77° F. of about 30 to 70, preferably 35 to 60 (ASTM D1321), and a refractive index at 80° C. of at least about 1.4480. The microcrystalline wax component is obtained by conventional methods from waxy petroleum distillation residues, such as residues being largely non-boiling at 1050° F., or by blending separately prepared microcrystalline waxes such that the desired properties are obtained.

In blending the paraffin wax and microcrystalline waxes to make the wax base for the finished product the relative concentrations, as previously mentioned, should be about 55 to 75% and about 25 to 45%, respectively. The actual proportions most advantageous for use will be determined in part by the additional considerations that the hardness of the wax base fall in the range of about 16 to 26, preferably about 20 to 24, needle penetration at 77° F. and the refractive index at 80° C. be at least about 1.4375, preferably at least about 1.4385.

The rubbery polymer component of the invention is a wax-compatible, normally solid amorphous hydrocarbon polymer having rubber-like properties of stretchability, elasticity, etc., at ambient temperatures. The polymers are characterized by molecules having long, essentially saturated hydrocarbon backbones, that is, a carbon-to-carbon linkage constituting the principal linear chain, with frequent lower alkyl side chains. The Staudinger molecular weights of the rubbery polymer are in the general range about 30,000 to 100,000 or 300,000 or more, with the lower range of about 30,000 to 50,000 offering certain advantages with respect to lower finished product viscosity and greater ease of blending. The polymers of the invention are generally derived from monomers having ethylenic unsaturation in the alpha-position and can be homopolymers provided that the monomer contains at least 4 carbons or copolymers of different 1-monoalkenes. Generally, rubbery characteristics are not found in homopolymers derived from monomers of less than 4 carbon atoms, although copolymers of ethylene and propylene or either of these olefins and higher molecular weight monoalkenes do provide suitable rubbery products when enough of the second olefin is present in the polymer. Thus, ethylene-propylene copolymers, for example, usually are rubbery when they contain about 20 to 75% ethylene. The rubber-like material, therefore, may be an ethylene-propylene copolymer or other olefin copolymers of the type $C_x/C_y$ where $C_x$ is a 1-monoalkene having from 2 to 5 carbon atoms and $C_y$ is a monoalkene having about 2 to 22 carbon atoms, where $C_x$ and $C_y$ are different olefins.

Suitable rubbery polymers can also be obtained by the copolymerization of 1-monoalkene of at least 4 carbon atoms and small amounts, usually about 0.5 to 3% by weight, of a diolefin of say 4 to 8 carbons, in order to retain the essentially saturated hydrocarbon backbone in the polymer and thereby preserve wax-compatibility. An example of this type of polymer is Butyl rubber (a copolymer of about 98% isobutylene and about 2% isoprene).

Although use of rubbery polymers as a component to improve seal and laminating strength of wax is not new and has been practiced for some time, there are several surprising aspects involved which contribute to the novelty of the present invention. Mere use of such a rubbery polymer does not insure improvement in seal strength. In fact, adding minor amounts of such a rubbery polymer to most petroleum waxes or wax blends does not significantly alter sealing strength. Certainly adding a rubbery material to typical commercial paraffin waxes (10 to 20 needle penetration at 77° F.) or to coating grade microcrystalline waxes (also about 10 to 20 needle penetration at 77° F.) does not result in a product showing any promise for the purposes of this invention. And if softer waxes are used, the addition of such a rubbery polymer normally results in severe blocking and sticking difficulties, particularly where, for instance, waxed paper is wound tightly into rolls and thus subjected to considerable pressure. This is not surprising, as rubbery polymers are used as a key component in making pressure sensitive adhesives.

It has been found, however, in the use of the described rubbery polymer in defined amounts in the composition of the present invention, the strength of the seal formed to synthetic films such as polypropylene can be greatly improved without the commonly resulting blocking tendency. The proper amount of rubbery additive is about 1 to 5%, preferably about 2 to 4%, by weight of the total composition. Less than about 1% does not greatly improve seal strength and yet it causes pressure blocking trouble. More than 5% also causes blocking trouble and contributes to high product viscosity which causes difficulty in waxing and also makes more difficult the obtaining of good wetting contact on polypropylene and other film at the light pressures which must be used in forming the seal in, for example, bread waxing operations.

The two anti-blocking additives of the present invention are ethylene-vinyl acetate copolymer and a straight chain fatty amide. The presence of each of these additives is required in order to achieve the purposes of the invention. Absence of the ethylene-vinyl acetate copolymer, for instance, results in a composition that provides unacceptable blocking performance, while absence of the fatty amide creates a composition with which pressure blocking occurs. Not only is it essential that each of the additives be present but it is equally important that a particular ethylene-acetate copolymer be selected and defined amounts of each of the additives be employed as will be discussed below.

The general type of ethylene-vinyl acetate is described in U.S. Patent No. 2,877,196 to Reding. However, the vinyl acetate content (by weight in the copolymer) of the ethylene-copolymer of the present invention should be about 25 to 30%. A copolymer having a vinyl acetate content of greater than about 30% is not sufficiently wax-compatible and a copolymer containing less than 25% vinyl acetate not only is unacceptable as a blocking aid but exerts a detrimental effect on seal strength. The molecular weight of the ethylene-vinyl acetate copolymer, as indicated by "melt index" can vary over a range of about 1 to 500. The concentration of the ethylene-vinyl acetate copolymer employed in the composition is about 2 to 15%. Generally the greater the concentration, the better the anti-blocking performance. However, the actual amount utilized may depend on the melt index of the copolymer added and whether or not product viscosity is of any consideration. When product viscosity is of no consideration, it is preferred to select a copolymer of low melt index, e.g. 1 to 25, since these generally give better anti-blocking performance. On the other hand, when product viscosity is a condsideration it is preferred to use a copolymer of high melt index or mixtures of copolymers predominating in high melt index copolymer.

If the concentration of ethylene-vinyl acetate coploymer is increased beyond about 15%, sealing performance suffers and susceptibility to pressure blocking may increase. Of course, there is also an undesirable increase in viscosity and cost.

The straight chain fatty amide component of the invention can be represented by the general formula:

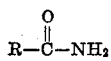

wherein R is an alkyl radical of 11 to 21 carbons, preferably 15 to 17 carbon atoms. Mixtures of these fatty amides can also be employed, if desired. The use of this type of amide as an anti-blocking agent in wax is not new. For example, it has been proposed in U.S. Patent 3,061,493 to Anderson that saturated and unsaturated long chain fatty amides are useful in reducing the tackiness of microcrystalline waxes, or wax blends which are predominantly microcrystalline. However, the utility of such amides as an anti-blocking agent has been found in actual practice to be very limited in those uses where sealing strength of the wax film is important, particularly where any smooth, non-porous film, such as cellophane, is involved, and even more so when polypropylene film is involved. Polypropylene is not only smooth and non-porous, but inherently difficult to adhere to because its molecules do not present suitable chemically or electrically active anchoring sites. Thus, when attempts are made to seal such amide-containing waxes to polypropylene, the bond, even if formed momentarily, loses most of its strength within a few hours. If the amount of amide used is reduced to a level such that seal is not impaired, the blocking problem still remains. Surprisingly, in the combination of materials of this invention, it is possible to obtain a definite anti-blocking benefit from a saturated, straight chain amide without incurring significant loss of seal strength. To do this, the concentration of amide must be very low, on the order of about 0.1 to 0.5, preferably about 0.2 to 0.3%, of the product weight. Small amounts of unsaturated fatty amides, such as a $C_{18}$ unsaturated amide, do not give consistent results.

The complete coating composition is made simply by melting the wax components together and blending in the amide and the two polymer additives with agitation at 250° or higher. The rubber additive is slowest to dissolve because of its higher molecular weight. Solution can be expedited in various ways such as by use of a high-shear agitator or by use of a heavy-duty kneader or mill in which the rubber is incorporated into a relatively small amount of wax the resulting concentrate blended with the remaining materials. However,, such handling is not essential, as the rubber additive as well as the ethylene-vinyl acetate copolymer is compatible with this wax and will be dispersed completely by a slow speed, blade agitator provided the bottom and sides of the vessel are subjected to the positive action of the blade.

After preparation, the composition is applied to paper stock or printed bread bands or other appropriate sheet. For optimum performance as a bread band, about 4 to 5 pounds per 3000 square feet of surface wax is applied to each side of a suitable paper stock. A bleached sulfite, one-side coated (with coating consisting of, e.g., various mineral pigments and starch or other binders), of about 25 pounds total weight per 3000 square feet is usually used. In addition to the 8 to 10 pounds of surface wax, some additional wax will penetrate into the paper, the amount depending on the porosity of the paper and the specific technique used in applying the wax. Typically, the paper is waxed by immersion in a bath or wax followed by metering to the desired film thickness by blades or squeeze rolls, after which the traveling web is submerged in cold water to provide the desired high gloss, then wound on rolls.

The following example is included to further illustrate the present invention.

Example

The following paraffin and microcrystalline waxes were employed as the base wax blend in the preparation of several wax compositions:

|  | Needle Penetration at 77° (ASTM D1321) | Melting Point (ASTM D87) | Viscosity, SSU/210° F. | Refractive Index at 80° C. |
| --- | --- | --- | --- | --- |
| Paraffin Wax A | 16 | 138 | 43.5 | 1.4338 |
| Paraffin Wax B | 15 | 153 | 47.0 | 1.4364 |
| Paraffin Wax C | 9 | 143 | 40.3 | 1.4305 |
| Paraffin Wax D | 21 | 147 | 47.0 | 1.4369 |
| Paraffin Wax E | 18 | 139 | 41.5 | 1.4321 |
| Microwax A | 49 |  | 87 | 1.4508 |
| Microwax B | 15 |  | 83 | 1.4483 |
| Microwax C | 57 |  | 88 | 1.4511 |

The wax compositions formulated as well as the additives employed are identified in Table I below. Each of the prepared samples was evaluated for blocking performance and sealing performance.

Block performance was evaluated by testing waxed paper specimens (a) by the gradient blocking test as described in TAPPI T652 TS–61 which measures the lowest temperature at which blocking tends to occur, and (b) by the Sinclair Pressure Blocking Test in which specimens are subjected to a uniform pressure of, e.g. 100 p.s.i.g., in addition to the temperature gradient of T652 TS–61. An unusual feature of the preferred compositions of this invention is that blocking temperature is often higher when pressure is applied. Normally, application of high pressure causes waxes to block at lower temperatures.

Sealing performance was evaluated by sealing together two plies of waxed paper and two plies of polypropylene or other transparent film, stacked alternately to form a film-paper-film-paper 4-ply specimen with film as the bottom ply. The four plies were sealed together by laying the specimen across a flat, elctrically heated metal bar 1.5 inches wide and surmounting the specimen with a padded weight exerting a uniform pressure of 1.7 gm./sq. inch. The specimen was then similarly cooled against a cold bar. or allowed to air cool. Thus, three seals were formed between the four plies, as in the packaging of bread, and each of the three seals were evaluated individually. Since the three seals on a specimen are necessarily subjected to somewhat different conditions of temperature, time, and effective pressure, the strengths of the seals, ordinarily, will differ. Using the compositions of this invention, however, even the weakest of the seals have been found to be strong.

The results of the tests are shown in Table I.

TABLE I

| | Compound No. | | | | | | | | | |
|---|---|---|---|---|---|---|---|---|---|---|
| | 1 | 2 | 3 | 4 | 5 | 6 | 7 | 8 | 9 | 10 |
| Wax Base: | | | | | | | | | | |
| Paraffin Wax A | 63 | 62.25 | 62 | 68.25 | 67 | | | | | 63 |
| Paraffin Wax B | | | | | | 60 | | | | |
| Paraffin Wax C | | | | | | | 64.5 | | | |
| Paraffin Wax D | | | | | | | | 65 | | |
| Paraffin Wax E | | | | | | | | | 52 | |
| Microwax A | 26 | 26 | 26 | 29 | 28.25 | | | 25 | | 27 |
| Microwax B | | | | | | 30 | | | | |
| Microwax C | | | | | | | 27 | | 35 | |
| Refractive Index at 80° C | 1.4386 | | | 1.4389 | | 1.4404 | 1.4365 | 1.4407 | 1.4400 | 1.4387 |
| Needle Penetration at 77° F | 22 | 22 | 22 | 21 | 21 | 15 | 20 | 22 | 24 | 23 |
| Percent Paraffin | 71 | 71 | 71 | 70 | 70 | 67 | 71 | 72 | 60 | 70 |
| Total Wax Base | 89 | 88.25 | 88 | 97.25 | 95.25 | 90 | 91.5 | 90 | 87 | 90 |
| Elvax 250 [1] | | | | | 2 | | | | | 6.25 |
| Elvax 220 [2] | 9 | 9 | 9 | | | 6 | 5½ | 6 | | |
| Co-Mer DQD 7268 [3] | | | | | | | | | 9 | |
| Armid HT [4] | | 0.25 | 0.5 | 0.25 | 0.25 | | | 0.25 | 0.25 | 0.25 |
| EPR-404 [5] | 2 | 2.5 | 2.5 | | | 4 | 3 | 3 | | 3.5 |
| Enjay Butyl 365 [6] | | | | 2.5 | 2.5 | | | | 3.75 | |
| Total Wt. Percent | 100 | 100 | 100 | 100 | 100 | 100 | 100 | 100 | 100 | 100 |
| Picking/Blocking temp., °F. (TAPPI T652 TS-61) | 110/112 | 103/111 | 108/115 | 80/99 | 97/107 | 135/135 | 113/115 | 133/133 | 106/110 | 101/105 |
| Picking/Blocking temp., °F. (at 100 p.s.i.g.) | 80/80 | 114/123 | 114/115 | 80/80 | 80/115 | 129/129 | 117/127 | 129/129 | 114/117 | 112/113 |
| Sealing Strength, paper to polypropylene, 4 ply specimen | Exc. | Exc. | Fair+ | Exc. | Exc. | Fair | Fair | Good− | Exc. | Exc. |

[1] Ethylene-vinyl acetate copolymer, 28% vinyl acetate, 15 melt index.
[2] Ethylene-vinyl acetate copolymer, 28% vinyl acetate, 150 melt index.
[3] Ethylene-vinyl acetate copolymer, 28% vinyl acetate, 400 melt index.
[4] Amide of hydrogenated tallow fatty acids, predominantly a mixture of palmitamide and stearamide.
[5] Ethylene-propylene rubber, copolymer marketed by Enjay Chemical Co., 43% ethylene, 57% propylene.
[6] Butyl rubber, a copolymer of approximately 98% isobutylene and 2% isoprene.

Examination of the data of Table I reveals the following:

Compound 1 illustrates that if the amide is not present, pressure blocking occurs, and if 0.25% amide is added, as in Compound 2, blocking resistance is good and also seal performance remains excellent. If the amide content is raised to 0.5% (Compound 3), seal performance becomes marginal (although still good compared to that of compositions currently finding use in commerce).

Compound 4 illustrates that without the vinyl acetate copolymer, blocking performance is unacceptable. (A blocking point of less than 100° F. can be disadvantageous.) Inclusion of 2% copolymer as in Compound 5 provides about the minimum permissible blocking performance for this particular combination of components.

Compound 6 illustrates that the use of the rubbery polymer is no guarantee of obtaining good seal performance, even with no amide present. Microwax B is too hard and the total wax base is too hard to give good seal performance. Compound 7 illustrates the case where refractive index of the base is too low. The wax base is made from components, each of which could be suitable, but when used together at the relative concentration of Compound 7 the high paraffinicity of Paraffin Wax C imparts too much crystallinity to the wax base, as indicated by the low refractive index. This results in weak cohesive strength which in turn results in a compound having seal performance which is much inferior to the high level of performance of compounds of this invention.

Compound 8 illustrates that when a relatively high melting paraffin wax component is used, seal performance is slightly reduced. Compounds 9 and 10, as well as 2, are examples of preferred compositions.

It is claimed:

1. A blocking resistant wax composition of high seal strength which consists essentially of a major amount of a wax blend of about 55 to 75% paraffin wax having a melting point of 135 to 148° F., a refractive index at 80° C. of 1.4290 to 1.4380, a viscosity of 39 to 48 SSU at 210° F., a needle penetration (ASTM D1321) at 77° F. of about 25 maximum and an oil content of less than 1%, and about 25 to 45% microcrystalline wax having a viscosity of 70 to 100 at 210° F., a needle penetration (ASTM D1321) at 77° F. of about 30 to 70 and a refractive index at 80° C. of at least about 1.4480, said wax blend having a needle penetration (ASTM D1321) at 77° F. of about 16 to 26, and a refractive index at 80° C. of at least about 1.4375, and said wax blend having incorporated therein about 1 to 5% by weight of a wax-compatible, normally solid rubbery hydrocarbon polymer having an essentially saturated hydrocarbon backbone and a molecular weight of about 30,000 to 300,000, about 2 to 15% by weight of an ethylene-vinyl acetate copolymer, said copolymer having a vinyl acetate content in the copolymer of about 25 to 30% and a melt index of about 1 to 500 and about 0.1 to 0.5% by weight of a saturated straight chain fatty amide whose chain is an alkyl radical of about 11 to 21 carbon atoms.

2. The composition of claim 1 wherein the normally solid rubbery hydrocarbon polymer is a copolymer of ethylene and propylene containing about 20 to 75% by weight ethylene.

3. The composition of claim 1 wherein the normally solid rubbery hydrocarbon polymer is a copolymer of isobutylene and about 0.5 to 3% by weight isoprene.

4. A blocking resistant wax composition of high seal strength which consists essentially of a major amount of a wax blend of about 55 to 75% paraffin wax having a melting point of about 136 to 144° F., a refractive index at 80° C. of 1.4320 to 1.4350, a viscosity of 41 to 45 SSU at 210° F., a needle penetration (ASTM D1321) at 77° F. of about 25 maximum and an oil content of less than 1% and about 25 to 45% microcrystalline wax having a viscosity of about 80 to 90 SSU at 210° F., a needle penetration (ASTM D1321) at 77° F. of about 35 to 60 and a refractive index at 80° C. of at least about 1.4480, said wax blend having a needle penetration (ASTM D1321) at 77° F. of about 20 to 24 and a refractive index at 80° C. of at least about 1.4385, having incorporated therein about 2 to 4% by weight of a wax-compatible normally solid rubbery hydrocarbon polymer having an essentially saturated hydrocarbon backbone and a molecular weight of about 30,000 to 50,000, about 2 to 15% by weight of an ethylene-vinyl acetate copolymer, said copolymer having a vinyl acetate content in the copolymer of about 25 to 30% and a melt index of about 1 to 500, and 0.2 to 0.3% by weight of a saturated straight chain fatty amide whose chain is an alkyl radical of about 15 to 17 carbon atoms.

5. The composition of claim 1 wherein the normally solid rubbery hydrocarbon polymer is copolymer of the type $C_x/C_y$ where $C_x$ is 1-monoalkene having from 2 to 5 carbon atoms and $C_y$ is monoalkene having about 2 to 22 carbon atoms, where $C_x$ and $C_y$ are different olefins.

6. The composition of claim 1 wherein the normally solid rubbery hydrocarbon polymer is copolymer of 1-monoalkene of at least 4 carbon atoms and diolefin of 4 to 8 carbons.

7. The composition of claim 4 wherein the normally solid rubbery hydrocarbon polymer is copolymer of the type $C_x/C_y$ where $C_x$ is 1-monoalkene having from 2 to 5 carbon atoms and $C_y$ is monoalkene having about 2 to 22 carbon atoms, where $C_x$ and $C_y$ are different olefins.

8. The composition of claim 4 wherein the normally solid rubbery hydrocarbon polymer is copolymer of 1-monoalkene of at least 4 carbon atoms and diolefin of 4 to 8 carbons.

References Cited

UNITED STATES PATENTS

| | | | |
|---|---|---|---|
| 2,877,196 | 3/1959 | Reding | 260—28.5 |
| 3,025,167 | 3/1962 | Butler | 260—28.5 |
| 3,051,673 | 8/1962 | Stark | 260—28.5 |
| 3,157,610 | 11/1964 | Richardson | 260—28.5 |
| 3,163,617 | 12/1964 | Nussle | 260—28.5 |
| 3,178,383 | 4/1965 | Stout | 260—28.5 |
| 3,197,426 | 6/1965 | Zaayenga | 260—28.5 |

MORRIS LIEBMAN, *Primary Examiner.*

JULIUS FROME, *Examiner.*